United States Patent [19]
Hayakawa

[11] 4,300,516
[45] Nov. 17, 1981

[54] SYSTEM AND METHOD FOR CONTROLLING EXHAUST GAS RECIRCULATION

[75] Inventor: Yukio Hayakawa, Kawasaki, Japan

[73] Assignee: Nissan Motor Company, Ltd., Yokohama, Japan

[21] Appl. No.: 148,938

[22] Filed: May 12, 1980

[30] Foreign Application Priority Data

May 15, 1979 [JP] Japan ................................. 54-58679

[51] Int. Cl.³ ........................................... F02M 25/06
[52] U.S. Cl. .................................... 123/571; 123/568; 180/309
[58] Field of Search ................. 180/309, 296; 123/571, 123/568, 569

[56] References Cited

U.S. PATENT DOCUMENTS

| 3,828,552 | 8/1974 | Nishiguchi | 123/571 |
| 3,906,207 | 9/1975 | Rivere et al. | 123/571 |
| 4,056,083 | 11/1977 | Wakita | 123/571 |
| 4,100,891 | 7/1978 | Williams | 123/571 |
| 4,163,282 | 7/1979 | Yamada et al. | 123/571 |

FOREIGN PATENT DOCUMENTS

| 52-63518 | 5/1977 | Japan | 123/571 |
| 54-137521 | 10/1979 | Japan | 123/571 |
| 2035453 | 6/1980 | United Kingdom | 123/571 |

Primary Examiner—Wendell E. Burns
Attorney, Agent, or Firm—Lowe, King, Price & Becker

[57] ABSTRACT

An exhaust gas recirculation control system for an internal combustion engine of a motor vehicle, comprising an exhaust gas recirculation control valve for controlling exhaust gas recirculated back to the engine when opened, and means for fully opening the exhaust gas recirculation control valve for a predetermined period of time when operating condition of the vehicle reaches a predetermined level, thereby preventing exhaust gas recirculation from performing with a delayed time relative to a required timing.

9 Claims, 8 Drawing Figures

SYSTEM AND METHOD FOR CONTROLLING EXHAUST GAS RECIRCULATION

BACKGROUND OF THE INVENTION

This invention relates in general to an improvement in a system and method for controlling exhaust gas recirculation (EGR) for an internal combustion engine of a motor vehicle, and more particularly to an improvement in an EGR control system of the type having an EGR control valve controlling communication between an exhaust gas conduit and an intake air conduit, a constant-vacuum valve for applying a vacuum to the EGR control valve, a pulse-operated electromagnetic valve for regulating the vacuum applied to the EGR valve, and a control unit for controlling the opening and closing of the electromagnetic valve in response to signals indicating an operating condition of the vehicle, and so arranged that the control unit gives the electromagnetic valve a command to open the EGR control valve such that an opening degree for exhaust gas recirculation in a required value is obtained, when the operating condition of the vehicle reaches the predetermined level.

In an EGR control system of the above-mentioned type when, for example, vehicle speed and the opening degree of a throttle valve for controlling intake air amount are below predetermined levels, respectively, exhaust gas recirculation is not, generally, carried out. When the vehicle speed and the throttle valve opening degree exceed the predetermined levels, respectively, the vacuum applied from the constant-vacuum valve to the EGR control valve is controlled in response to a pulse width by which fuel injection amount is controlled, which pulse width corresponding to engine speed and intake air amount. The thus controlled vacuum operates the EGR control valve so as to obtain the exhaust gas recirculation in a required value. However, such an EGR control system has encountered a problem in that a relatively long period of time is necessary until a required opening degree of the EGR control valve is actually obtained from a time point at which the opening degree of the throttle valve reaches the predetermined level upon a vehicle speed higher than the predetermined level. As a result, the starting of the exhaust gas recirculation is delayed and accordingly exhaust gas recirculation cannot be performed when required.

SUMMARY OF THE INVENTION

According to the present invention, with an exhaust gas control system of the type using an exhaust gas recirculation control valve which is openable to recirculate exhaust gas back to an intake system of an internal combustion engine, the EGR control valve is fully opened for a predetermined period of time when the operating condition of the motor vehicle reaches a predetermined level.

More specifically, the instance the throttle valve becomes opened from its fully closed positioin or idle position during vehicle cruising at a vehicle speed higher than 8 Km/hr, a pulse-operated electromagnetic valve is fully closed for a predetermined period of time, for example, 0.2 second which does not seem to exert harmful influence upon the driveability of the motor vehicle. This is accomplished by applying to the pulse-operated electromagnetic valve a command signal having OFF-duty 100%. Thus, the vacuum from a constant-vacuum valve is directly supplied to the EGR control valve for 0.2 second so that the EGR control valve can be abruptly fully opened for 0.2 second before a signal for a required exhaust gas recirculations reaches the pulse-operated electromagnetic valve from the control unit, by which a delayed time of the exhaust gas recirculation starting can be effectively corrected, to perform smooth exhaust gas recirculation to the engine.

An object of the present invention is to provide an improved system and method for controlling exhaust gas recirculation for an internal combustion engine of a motor vehicle, by which exhaust gas recirculation can be started and performed exactly when required.

Another object of the present invention is to provide an improved system and method for controlling exhaust recirculation for an internal combustion engine of a motor vehicle, by which an EGR control valve can be opened at a desired degree immediately after a throttle valve becomes opened from its fully closed position.

A further object of the present invention is to provide an improved system and method for controlling exhaust gas recirculation for an internal combustion engine of a motor veicle, by which a delayed time with which the opening degree of the EGR control valve reaches a required level which causes exhaust gas recirculation in a required value.

Other objects, features and advantages of the improved system and method for controlling exhaust gas recirculation according to the present invention will become more apparent from the following description taken in conjunction with the accompanying drawings.

DESCRIPTION OF THE PREFERRED EMBODIMENTS

Figure 1:
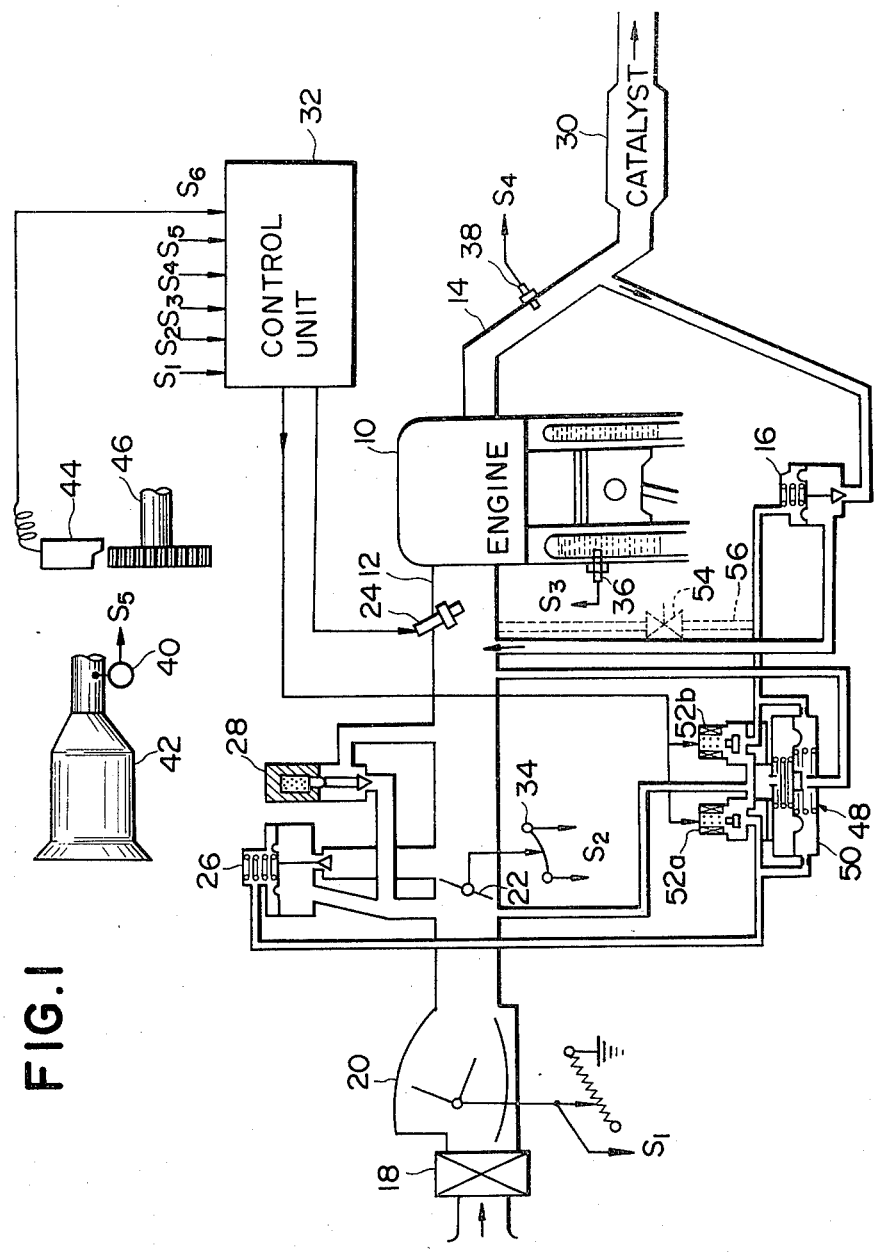
FIG. 1 is a schematic illustration of an exhaust gas recirculation control system in accordance with the present invention.

Referring now to FIG. 1 of the drawings, an exhaust gas recirculation (EGR) system according to the present invention is shown incorporated with an internal combustion engine 10 which is provided with an intake air conduit or passageway 12 and an exhaust gas conduit or passageway 14. The intake and exhaust gas passageways 12 and 14 are communicable through an exhaust gas recirculation (EGR) control valve 16, by which a part of exhaust gas flowing through the exhaust gas passageway 14 is recirculated back or supplied to the intake air passageway 12 when required. The intake passageway 12 is provided with an air filter 18 to purify atmospheric air inducted to the engine 10. An air flow meter 20 is disposed in the intake air passageway 12 downstream of the air filter 18 to measure the air amount flowing through the intake air passageway 12. A throttle valve 22 is rotatably disposed in the intake air passageway 12 downstream of the air flow meter 20 so as to control the air flow amount passing through the intake air passageway 12. A fuel injector 24 is disposed in the intake air passageway 12 immediately upstream of the engine 10 in order to inject metered fuel to be supplied to the engine 10. An idle control valve 26 is fluidly connected to the intake air passageway 12 to control air required for idling. An air regulator 28 is also fluidly connected to the intake air passageway 12 to control air supplied downstream of the throttle valve 22. A catalytic converter 30 is disposed in the exhaust gas passageway 14 to oxidize and reduce the noxious constituents in the exhaust gases passing through the exhaust gas passageway 14.

A control unit 32 is provided to process various input signals and to electrically and indirectly control the EGR control valve 16 and the fuel injection from the fuel injector 24 in accordance with the signals. The various inputs, in this case, consist of an air flow amount signal $S_1$ from the air flow meter 20, a throttle position signal $S_2$ from a throttle position switch 34 operatively connected to the throttle valve 22, a temperature signal $S_3$ from an engine coolant temperature sensor 36 disposed in an engine coolant passage (no numeral) formed in the engine 10, an oxygen concentration signal $S_4$ from an oxygen sensor 38, a vehicle speed signal $S_5$ from a vehicle speed sensor 36 installed in connection with an output shaft of a transmission 42, and a crank angle signal $S_6$ from a crank angle sensor 44 for sensing the rotation of an engine crankshaft 46.

A vacuum regulator 48 for controlling opening and closing of the EGR control valve 16 comprises a constant-vacuum valve 50, a pulse-operated vacuum control valve 52a and a pulse-operated electromagnetic valves 52b both associated with the valve 50. The constant-vacuum valve 48 functions to obtain a constant vacuum by modifying intake vacuum introduced into the constant-vacuum valve 50 from the intake air passageway 12. Each electromagnetic valve 52a or 52b is supplied with square waves with a constant period and controlled in accordance with the variation of duty ratio or value of the square wave signals, i.e., the instantaneous rate of ON and OFF times (referred to as ON-duty% and OFF-duty%, respectively) of the square wave signals within a certain time period, by which the vacuum developed in the constant-vacuum valve 48 is suitably diluted with air from the intake air passageway 12 so as to supply a desired vacuum to a vacuum operating chamber (no numeral) of the EGR control valve 16. The vacuum supplied to the vacuum operating chamber decides the opening degree of the EGR control valve 16 so as to control the exhaust gas recirculation from the exhaust gas passageway 14 to the intake air passageway 12.

The manner of operation of the EGR control system in accordance with the present invention will be explained with reference to FIGS. 1 and 2.

Figure 2:
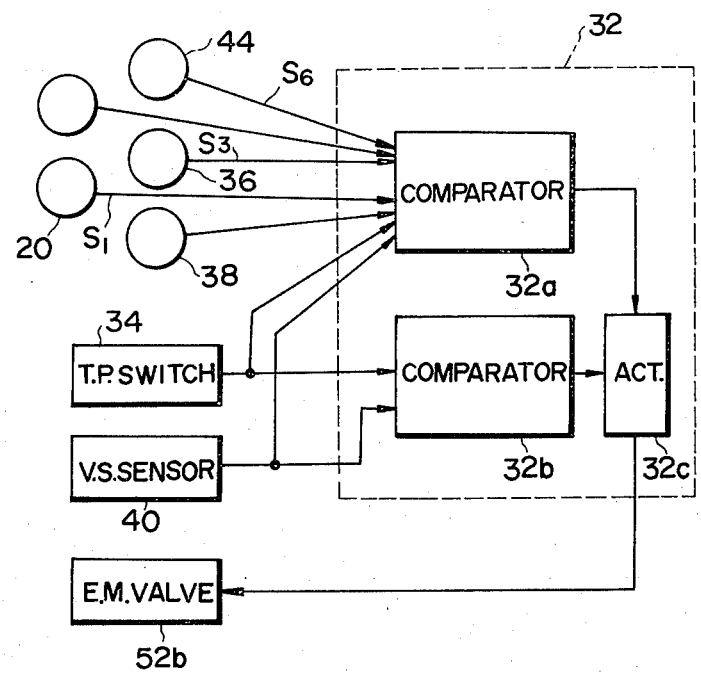
FIG. 2 is a schematic block diagram illustrating the function of a control unit used in the system of FIG. 1.

A comparator 32b of the control unit 32 is supplied with an information signal indicating vehicle speed exceeds, for example, a predetermined level such as 8 Km/hr from the vehicle speed sensor 40 and an information signal indicating that the throttle valve 22 becomes opened from its fully closed position or idling position from the throttle position sensor 34, as shown in FIG. 2. The comparator 32b is independent and separate from another comparator 32a for producing usual duty value in accordance with various operating parameters of the motor vehicle. Accordingly, the comparator 32b controls the actuator 32c through a route which is different from another route through which the comparator 32a controls the actuator 32c. Thus, the pulse-operated electromagnetic valve 52b receives from the actuator 32c a command signal having OFF-duty 100% (for continuously fully closing the electromagnetic valve 52b). This signal is kept to be produced by the control unit during, for example, 0.2 second, in other words, a state of OFF-duty 100% is kept during 0.2 second. The time period of 0.2 second is decided from a standpoint of preventing driveability of the vehicle from degradating. It will be understood that, because of OFF-duty 100%, the maximum vacuum is applied to the EGR control valve 16, so that the EGR control valve is fully opened for 0.2 seconds. Thus, the EGR control valve is supplied with the maximum vacuum to be fully opened before supplied with a certain vacuum to obtain a required value of exhaust gas recirculation in response to signals based upon operating parameters of the vehicle. This prevents or corrects a delayed operation of the EGR control valve when the throttle valve 22 becomes opened from its fully closed position.

After the above-mentioned time period or 0.2 second lapses, the command signal having OFF-duty 100% is cancelled and therefore the value of OFF and ON-duties applied to the electromagnetic valve 52b is controlled in accordance with usual command signals from the control unit 32. In this regard, it will be appreciated from the foregoing that an excess amount of exhaust gas is not recirculated back to the engine because the time period for fully opening the EGR control valve is very short.

The control manner of exhaust gas recirculation in accordance with the present invention will be explained in detail in comparison with that according to a conventional technique with reference to FIGS. 3A to 4C.

Now, idling speed is controlled as follows: The control unit 32 is supplied with an information signal from the crank angle sensor 44, so that the engine speed is sensed. Furthermore, the control unit 32 is supplied with an output signal from the throttle position switch 34, an output signal from the coolant temperature sensor 36, an output signal from the vehicle speed sensor 40. Then, the sensed engine speed is compared with a target engine speed which is memorized relative to coolant temperature in the control unit 32. If the sensed engine speed is different from the target engine speed, the control unit 32 applies a duty to the electromagnetic valve 52b so that the vacuum in the constant-vacuum valve 50 acts on the idling control valve 26. As a result, the air amount introduced to the intake air passageway 12 downstream of the throttle valve 22 is regulated to control the idling speed at the target level.

Figure 3A:
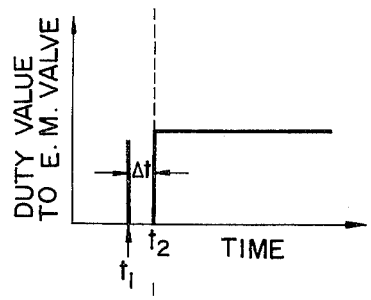
FIGS. 3A, 3B and 3C are graphs showing duty value applied to a pulse-operated electromagnetic valve, operating vacuum applied to EGR control valve, EGR rate, on lapse of time, respectively, in a conventional exhaust gas recirculation control manner.
Figure 3B:
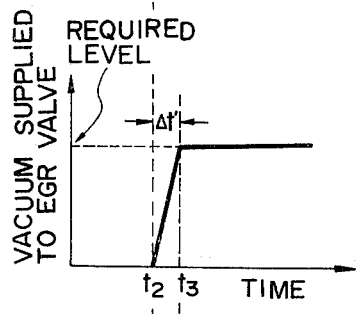
Figure 3C:
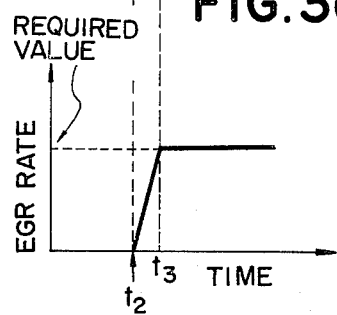

FIGS. 3A to 3C show a process, in a conventional manner, from switching of the throttle position switch 34 to starting of exhaust gas recirculation in a required value. As shown in FIG. 3A, the instant $t_1$ the throttle valve 22 moves from its idle position and the throttle position switch 34 turns into an OFF position (the throttle position switch is arranged to turn into the OFF position when the throttle valve opened from its idle position), the control unit 32 starts to compute a required value of exhaust gas recirculation and decides the duty ratio of the signals corresponding to the required amount of exhaust gas recirculation. The signal is then supplied to the pulse-operated electromagnetic valve 52b. Accordingly, the OFF-duty value applied to the electromagnetic valve 52b varies at a time point $t_2$ at which a time $\Delta t$ lapses from the time point $t_1$. Then, the EGR control valve 16 is supplied with a vacuum from the vacuum regulator 58, and the magnitude of the vacuum supplied to the EGR control valve 16 starts to increase as shown in FIG. 3B so that the required value of the vacuum is obtained at a time point $t_3$ at which $\Delta t'$ lapses from the time point $t_2$. As appreciated from FIG. 3B, EGR rate (the volume rate of recirculated exhaust gas relative to intake air amount) varies similarly to the operating vacuum applied to the EGR control valve 16 shown in FIG. 3B, so that a required value of exhaust gas recirculation is attained at the time point $t_3$ at which the time $\Delta t + \Delta t'$ lapses from the time point $t_1$ at which the throttle switch turns into the OFF-position. In this case, a timing at which the exhaust gas recirculation required to start is approximately at the time point $t_2$ and accordingly the exhaust gas recirculation actually starts being delayed by the time $t'$ from the timing required.

Figure 4A:
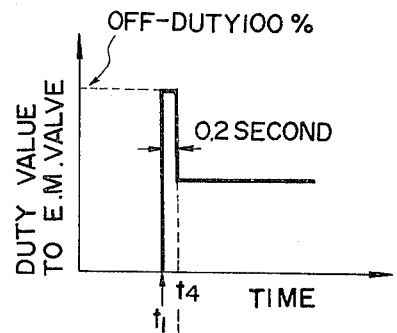
FIGS. 4A, 4B and 4C are graphs showing duty value applied to a pulse-operated electromagnetic valve, operating vacuum applied to EGR control valve, EGR rate, respectively, on lapse of time, in an exhaust gas recirculation control manner in accordance with the present invention.
Figure 4B:
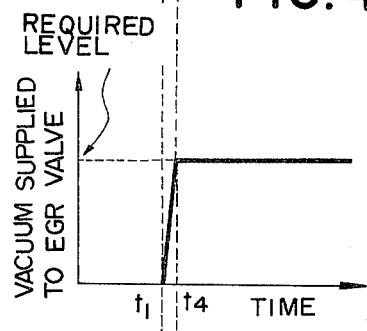
Figure 4C:
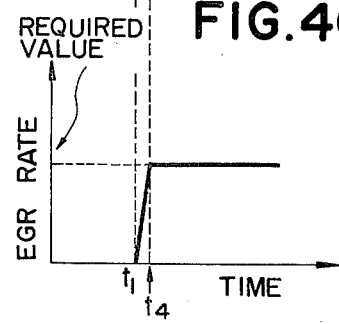

In order to solve the difficulty encountered in such a conventional EGR control manner shown in FIGS. 3A to 3C, the exhaust gas recirculation is controlled in accordance with the present invention, for example, as illustrated in FIGS. 4A to 4C.

As seen from FIG. 4A, the instant the throttle position switch 34 turns to the OFF position upon vehicle cruising at a speed of 8 Km/hr, the duty value of the signal applied to the electromagnetic valve 52b becomes OFF-duty 100% only for a time period of 0.2 second. After a time point $t_4$ at which 0.2 seconds lapses from the time point $t_1$, the electromagnetic valve 52b is supplied with a command signal having a duty value computed by the control unit 32 in response to the information signals corresponding to the operating condition of the motor vehicle. As apparent from the above, since the electromagnetic valve 52b is fully closed for a time period of 0.2 second, the vacuum prepared by the constant-vacuum valve 50 is supplied as it is to the EGR control valve 16, so that the operating vacuum of the EGR control valve abruptly increases as shown in FIG. 4B. In this regard, the EGR rate also abruptly increases as shown in FIG. 4C. It is to be noted that an approximately ideal EGR rate can be obtained at the time point $t_4$ at which the exhaust gas recirculation in the required value is eagerly necessitated.

As appreciated from the above, according to the present invention, when the throttle valve 22 becomes opened from its fully closed position, the duty value for controlling the electromagnetic valves becomes OFF-duty 100% for a predetermined time period, regardless of the duty value corresponding to a usual required value of exhaust gas recirculation. By virtue of this, the EGR control valve is abruptly fully opened so that a necessary value of exhaust gas recirculation can be obtained at the time at which the exhaust gas recirculation is necessary. As a result, the delayed time $\Delta t'$ for starting the exhaust gas recirculation can be approximately completely corrected. It may be easy to sufficiently shorten the time period of OFF-duty 100% in order to prevent EGR rate from temporarily increasing.

While a delayed time in operation of EGR control valve has been shown and described as corrected by applying a control signal other than a usual control signal to the pulse-operated electromagnetic valve 52b for a short period of time, it will be understood that it may be accomplished by opening for a short period of time a normally closed valve 54 in response to a signal from the throttle position switch 34. The valve 54 is disposed in a by-pass passage 56 connecting the intake air passageway 12 and a passage (no numeral) leading to the EGR control valve 16 as indicated by broken lines in FIG. 1.

What is claimed is:

1. An exhaust gas recirculation control system for an internal combustion engine of a motor vehicle, comprising:

an exhaust gas recirculation control valve for controlling the amount of exhaust gas recirculated back from an intake system of the engine to an intake system of the engine when opened, in accordance with operating condition of the vehicle; and means for fully opening said exhaust gas recirculation control valve for a predetermined period of time when the operating condition of the vehicle reaches a predetermined level.

2. An exhaust gas recirculation control system as claimed in claim 1, in which said operating condition of the vehicle includes a predetermined vehicle speed and a predetermined opening degree of a throttle valve for controlling intake air amount supplied to the engine.

3. An exhaust gas recirculation control system as claimed in claim 2, in which said means includes a control unit for producing a signal for indirectly controlling said exhaust gas recirculation control valve to be fully opened when said vehicle speed and the opening degree of said throttle valve reach said predetermined levels, respectively.

4. An exhaust gas recirculation control system as claimed in claim 2, in which said means includes a valve disposed between said intake system and said exhaust gas recirculation control valve, said valve being operatively connected to said throttle valve so that intake air in the intake system is controllably supplied to the exhaust gas recirculation control valve in response to the movement of said throttle valve.

5. An exhaust gas recirculation control system for an internal combustion engine of a motor vehicle, comprising:

an exhaust gas recirculation control valve for controlling communication between an intake air and exhaust gas passageway of the engine so as to control exhaust gas recirculation, exhaust gas recirculation in a predetermined value being performed at a predetermined opening degree of said exhaust gas recirculation control valve;

a constant-vacuum valve for preparing a constant vacuum to be supplied to said exhaust gas recirculation control valve;

a pulse-operated electromagnetic valve for modifying the constant vacuum to be supplied to said exhaust gas recirculation control valve so as to obtain said predetermined opening degree of said exhaust gas recirculation control valve when receiving a predetermined command signal;

a control unit for producing said command signal in response to a vehicle speed signal indicating that a vehicle speed exceeds a predetermined level and a throttle position signal indicating that a throttle valve opening degree exceeds a predetermined level; and means for so controlling, for a predetermined period of time, said pulse-operated electromagnetic valve that said constant-vacuum from said constant-vacuum valve is directly supplied to said exhaust gas recirculation control valve so as to be fully opened immediately before production of said command signal, when the vehicle speed and throttle valve opening degree exceed said predetermined levels, respectively.

6. A method for controlling exhaust gas recirculation for an internal combustion engine of a motor vehicle, by using an exhaust gas recirculation control valve which is openable to recirculate exhaust gas back to an intake system of the engine, comprising the step of:

fully opening said exhaust gas recirculation control valve for a predetermined period of time when the operating condition of the vehicle reaches a predetermined level.

7. A method for controlling exhaust gas recirculation for an internal combustion engine of a motor vehicle, comprising:

controlling exhaust gas recirculation from an intake system of the engine to an exhaust system of the engine by varying the opening degree of the exhaust gas recirculation control valve; and fully opening said exhaust gas recirculation control valve for a predetermined period of time when operating condition of the vehicle reaches a predetermined level.

8. A method as claimed in claim 7, in which said predetermined level of operating condition includes a predetermined vehicle speed and a predetermined throttle valve opening degree.

9. A method as claimed in claim 8, in which the step of fully opening said exhaust gas recirculation control valve includes the step of temporarily supplying intake vacuum in said intake system to said exhaust gas recirculation control valve when said vehicle speed and the opening degree of said throttle valve reach said predetermined levels, respectively.

* * * * *